United States Patent [19]
Inagawa et al.

[11] Patent Number: 6,046,903
[45] Date of Patent: Apr. 4, 2000

[54] ELECTRIC DOUBLE LAYER CAPACITOR HAVING A SEPARATION WALL

[75] Inventors: Masako Inagawa; Yoshiki Inoue, both of Tokyo, Japan

[73] Assignee: NEC Corporation, Tokyo, Japan

[21] Appl. No.: 09/116,568

[22] Filed: Jul. 16, 1998

[30] Foreign Application Priority Data

Jul. 18, 1997 [JP] Japan .................................. 9-193678

[51] Int. Cl.[7] .............................. H01G 9/02; H01G 9/00
[52] U.S. Cl. ......................... 361/502; 361/512; 361/504
[58] Field of Search ................................... 361/502, 503, 361/504, 511, 512

[56] References Cited

U.S. PATENT DOCUMENTS

| | | | |
|---|---|---|---|
| 5,381,303 | 1/1995 | Yoshida et al. | 361/502 |
| 5,742,474 | 4/1998 | Shimizu et al. | 361/502 |
| 5,786,981 | 7/1998 | Aoki et al. | 361/502 |

*Primary Examiner*—Kristine Kincaid
*Assistant Examiner*—Anthony Dinkins
*Attorney, Agent, or Firm*—Young & Thompson

[57] ABSTRACT

The present invention provides an electric double layer capacitor including: a gasket; a pair of collectors tightly fitted with the gasket to form a tightly sealed internal space; and polarizable electrodes with an electrolyte solution being accommodated in the tightly sealed inner space, wherein the gasket has at least a separation wall which separates the internal space into at least two sub-spaces, so that each of the sub-spaces accommodates a pair of the polarizable electrodes and the electrolyte solution.

37 Claims, 9 Drawing Sheets

ELECTRIC DOUBLE LAYER CAPACITOR HAVING A SEPARATION WALL

BACKGROUND OF THE INVENTION

The present invention relates to an electric double layer capacitor, and more particularly to an electric double layer capacitor having polarizable electrodes in solid state.

FIG. 1 is a schematic perspective view illustrative of a cell lamination structure of a conventional electric double layer capacitor. FIG. 2 is a cross sectional view illustrative of a conventional electric double layer capacitor taken along an A–A' line of FIG. 1. FIG. 3 is a cross sectional view illustrative of a cell structure of a conventional electric double layer capacitor of FIG. 1.

With reference to FIG. 1, the cell lamination structure 8 of the conventional electric double layer capacitor comprises gaskets 2, basic cells 5 adjacent to the gaskets 2, terminal electrodes 6 sandwiching the gaskets 2 and the basic cells 5, pressure plates 7 sandwiching the terminal electrodes 6.

With reference to FIG. 2, the gasket 2 surrounds a collector 3 which further surrounds the polarizable electrode 1. The polarizable electrode 1 comprises an activated carbon in solid state such as an activated carbon/polyacetone material. The activated carbon has many pores for containing an electrolyte solution so that charges are accumulated on interfaces between the electrolyte solution and inner walls of the pores of the activated carbon of the polarizable electrode 1. The collector 3 is made of a rubber or plastic which contains an electrically conductive carbon. The collector 3 is tightly fitted with the gasket 2. The collector 3 may also be made of a metal foil except when an acidic electrolyte solution is used.

With reference to FIG. 3, the polarizable electrodes 1 in the form of a pair are separated by a porous separator 4. An electrolyte solution 9 is confined in a space defined by an inner wall of the gasket 2 and inner walls of the collectors 3. The electrolyte solution 9 is confined between the polarizable electrodes 1 and the inner wall of the gasket 2 and also confined in a large number of the pores of the activated carbon of each of the polarizable electrodes 1. The electrolyte solution 9 is sealed with the collector 3 and the gasket 2. A withstand voltage of the electric double layer capacitor is limited by an electrolyzing voltage of the electrolyte solution 9, for which reason the necessary number of the basic cells 5 are connected in series to obtain a required withstand voltage to thereby form a laminated structure of the basic cells 5. The pressure plates 7 are provided to give a constant pressure to the laminated structure of the basic cells 5, so as to reduce contact resistances between the basic cells 5 and also between the basic cell 5 and the terminal electrode 6.

In the meantime, the use of the polarizable electrodes 1 results in an increase in capacitance of the electric double layer capacitor. Further, an equivalent series resistance of the electric double layer capacitor could be reduced. In these circumstances, recently new uses of the electric double layer capacitor have become attractive. For example, the electric double layer capacitor may be used in combination with a lead battery to act as a battery for driving starter motors for automobiles. Further, the electric double layer capacitor may be used in combination with a solar battery to act as an auxiliary power supply.

A high reliability is essential commonly to the electric double layer capacitors, but the required characteristics of the electric double layer capacitors are different for the use.

Actually, however, it was difficult for the conventional electric double layer capacitors to keep a high reliability for the following reasons. The conventional electric double layer capacitor has an incomplete sealing structure. If a predetermined voltage is applied to the electric double layer capacitor, then an oxidation-reduction reaction is caused to generate a gas for all kinds of the electrolyte solutions. Particularly when a sulfuric acid solution is used, the amount of the gas generated is maximum even characteristics such as ion conductivity are preferable. As compared to the other electrolyte solutions, the sulfuric acid solution generates a large amount of the gas and largely increases an internal pressure of the cell laminations 8 whereby the cell laminations 8 are expanded for a short time, resulting in a certain possibility of breaking the cell laminations 8.

In order to solve the above problems, it may be effective to use an organic electrolyte solution which is likely to generate a small amount of the gas. However, the use of the organic electrolyte solution is also engaged with a disadvantage in a low ion conductivity which increases the equivalent series resistance. This further causes that ions are enlarged in diameter whereby a movable speed of the ions is delayed. This makes it difficult to use the electric double layer capacitor under a large current condition.

The conventional electric double layer capacitor has an incomplete sealing structure which allows a vaporization of a hydrated electrolyte solution through a gap between the gaskets.

In the above circumstances, it had been required to develop a novel electric double layer capacitor free from the above problems and disadvantages.

SUMMARY OF THE INVENTION

Accordingly, it is an object of the present invention to provide a novel electric double layer capacitor free from the above problems.

It is a further object of the present invention to provide a novel electric double layer capacitor having a high reliability.

It is a still further object of the present invention to provide a novel electric double layer capacitor allowing an improvement in productivity.

It is yet a further object of the present invention to provide a novel electric double layer capacitor allowing a size-down.

It is a further more object of the present invention to provide a novel multiple purpose electric double layer capacitor with a simple structure.

It is still more object of the present invention to provide a novel electric double layer capacitor capable of suppressing a generation of a gas at a small amount upon application of a voltage to the capacitor.

It is moreover object of the present invention to provide a novel electric double layer capacitor capable of suppressing evaporation of an electrolyte solution used therein.

It is another object of the present invention to provide an improved gasket structure of an electric double layer capacitor free from the above problems.

It is still another object of the present invention to provide an improved gasket structure of an electric double layer capacitor having a high reliability.

It is yet another object of the present invention to provide an improved gasket structure of an electric double layer capacitor allowing an improvement in productivity.

It is further another object of the present invention to provide an improved gasket structure of an electric double layer capacitor allowing a size-down.

It is an additional object of the present invention to provide an improved gasket structure of a multiple purpose electric double layer capacitor with a simple structure.

It is a still additional object of the present invention to provide an improved gasket structure of an electric double layer capacitor capable of suppressing a generation of a gas at a small amount upon application of a voltage to the capacitor.

It is yet an additional object of the present invention to provide an improved gasket structure of an electric double layer capacitor capable of suppressing evaporation of an electrolyte solution used therein.

The first present invention provides an internal structure of a gasket for an electric double layer capacitor, wherein the internal structure of the gasket has at least a separation wall which separates an internal space of the gasket into at least two sub-spaces, so that each of the sub-spaces accommodates a pair of polarizable electrodes and an electrolyte solution.

The second present invention also provides an electric double layer capacitor comprising: a gasket; a pair of collectors tightly fitted with the gasket to form a tightly sealed internal space; and polarizable electrodes with an electrolyte solution being accommodated in the tightly sealed inner space, wherein the gasket has at least a separation wall which separates the internal space into at least two sub-spaces, so that each of the sub-spaces accommodates a pair of the polarizable electrodes and the electrolyte solution.

The third present invention also provides an electric double layer capacitor comprising; a frame-shaped gasket having opposite opening sides distanced in a first direction; a pair of flat plate collectors extending in parallel to a plane vertical to the first direction and the flat plate collectors being tightly fitted with the gasket to form a tightly sealed internal space; and porous polarizable electrodes with an electrolyte solution being accommodated in the tightly sealed internal space, wherein the gasket has at least a separation wall extending in parallel to the first direction and the separation wall separates the internal space into at least two sub-spaces, so that each of the sub-spaces accommodates a pair of the polarizable electrodes and the electrolyte solution. This allows the electrolyte solution to be separated by the separation wall. This also allows a high productivity of the electric double layer capacitor.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
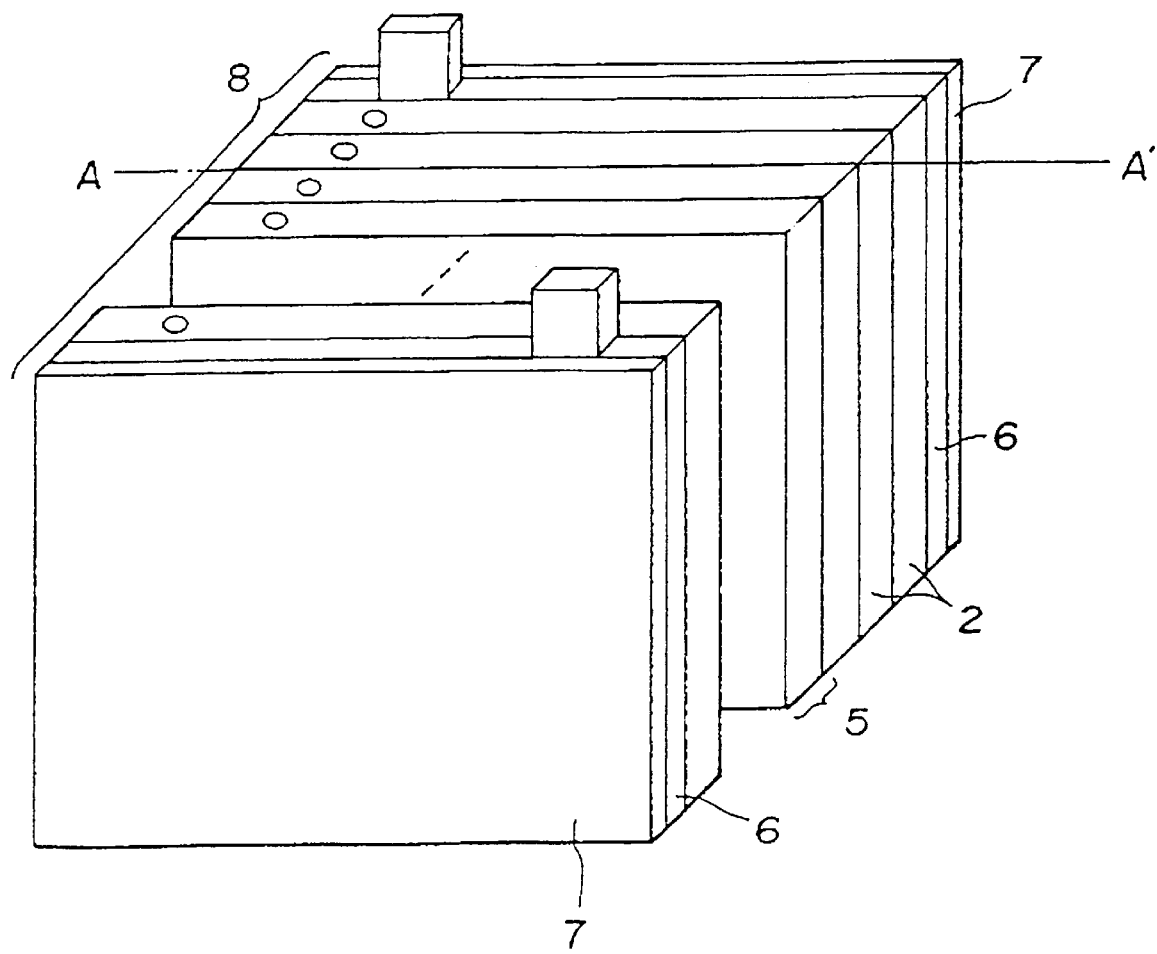
FIG. 1 is a schematic perspective view illustrative of a cell lamination structure of a conventional electric double layer capacitor.

The first present invention provides an internal structure of a gasket for an electric double layer capacitor, wherein the internal structure of the gasket has at least a separation wall which separates an internal space of the gasket into at least two sub-spaces, so that each of the sub-spaces accommodates a pair of polarizable electrodes and an electrolyte solution.

It is preferable that the separation wall extends along a direction vertical to a plane parallel to which collector plates are provided to define a sealed inner space in combination with the gasket. This allows the electrolyte solution to be separated by the separation wall. This also allows a high productivity of the electric double layer capacitor.

It is also preferable that the separation wall comprises a single flat wall to form two generally rectangular-parallelepiped sub-spaces.

It is also preferable that the separation wall comprises a plurality of flat walls to form at least three generally rectangular-parallelepiped sub-spaces.

It is also preferable that the separation wall comprises at least a prism-shaped wall to form at least two co-axially aligned prism-shaped sub-spaces. For example, an organic electrolyte solution exhibiting a small amount of evaporation may be contained in the outer sub-space whilst a hydraulic electrolyte solution possessing a high ion conductivity may be contained in the inner sub-space whereby the good property such as the high ion conductivity can be obtained whilst the evaporation of the electrolyte solution can be suppressed as much as possible due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The inner sub-space containing the hydraulic electrolyte solution is suitable for a large current discharge from the capacitance. By contrast, the outer sub-space containing the hydraulic electrolyte solution is suitable for a small current discharge from the capacitance.

It is also preferable that the separation wall comprises at least a cylindrically-shaped wall to form at least two co-axially aligned cylindrically-shaped sub-spaces. For example, an organic electrolyte solution exhibiting a small amount of evaporation may be contained in the outer subspace whilst a hydraulic electrolyte solution possessing a high ion conductivity may be contained in the inner subspace whereby the good property such as the high ion conductivity can be obtained whilst the evaporation of the electrolyte solution can be suppressed as much as possible due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The inner sub-space containing the hydraulic electrolyte solution is suitable for a large current discharge from the capacitance. By contrast, the outer sub-space containing the hydraulic electrolyte solution is suitable for a small current discharge from the capacitance.

It is also preferable that different kinds of the electrolyte solution are contained in the sub-spaces. In this case, it is further preferable that the different kinds of the electrolyte solution comprise different hydraulic electrolyte solutions such as a sulfuric acid solution, a potassium hydroxide solution and a sodium chloride solution. Alternatively, it is further preferable that the different kinds of the electrolyte solution comprise an organic electrolyte solution such as dimethyl formamide solution into which an ammonium salt is dissolved, and a hydraulic electrolyte solution such as a sulfuric acid solution, a potassium hydroxide solution and a sodium chloride solution. For example, the organic electrolyte solution exhibiting a small amount of evaporation may be contained in the left sub-space whilst the hydraulic electrolyte solution possessing a high ion conductivity may be contained in the right sub-space whereby the good property such as the high ion conductivity can be obtained whilst the evaporation of the electrolyte solution can be suppressed due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The right sub-space containing the hydraulic electrolyte solution is suitable for a large current discharge from the capacitance. By contrast, the left sub-space containing the hydraulic electrolyte solution is suitable for a small current discharge from the capacitance.

It is also preferable that at least an inner wall portion of the gasket and at least surface regions of the separation wall are made of an insulating material.

The above novel internal structure of the gasket in accordance with the first present invention provides the following effects. It is possible to form the electric double layer capacitor responsible for the multipurposes by containing different electrolyte solutions in the sub-spaces separated by the separation wall without, however, increase in the number of parts of the capacitor and also without scaling up. This means it possible to improve the productivity and the scaling down of the electric double layer capacitor.

Further, it is possible to keep the high reliability of the electric double layer capacitor by suppressing an amount of the gas generated in an oxidation-reduction reaction upon application of a driving voltage to the capacitor and also suppressing an evaporation of the electrolyte solution with keeping a good characteristic provided by the high ion conductivity.

The second present invention also provides an electric double layer capacitor comprising: a gasket; a pair of collectors tightly fitted with the gasket to form a tightly sealed internal space; and polarizable electrodes with an electrolyte solution being accommodated in the tightly sealed inner space, wherein the gasket has at least a separation wall which separates the internal space into at least two sub-spaces, so that each of the sub-spaces accommodates a pair of the polarizable electrodes and the electrolyte solution.

It is preferable that the separation wall extends along a direction vertical to a plane parallel to which collector plates are provided to define the tightly sealed inner space in combination with the gasket. This allows the electrolyte solution to be separated by the separation wall. This also allows a high productivity of the electric double layer capacitor.

It is also preferable that the separation wall comprises a single flat wall to form two generally rectangular-parallelepiped sub-spaces.

It is also preferable that the separation wall comprises a plurality of flat walls to form at least three generally rectangular-parallelepiped sub-spaces.

It is also preferable that the separation wall comprises at least a prism-shaped wall to form at least two co-axially aligned prism-shaped sub-spaces. For example, an organic electrolyte solution exhibiting a small amount of evaporation may be contained in the outer sub-space whilst a hydraulic electrolyte solution possessing a high ion conductivity may be contained in the inner sub-space whereby the good property such as the high ion conductivity can be obtained whilst the evaporation of the electrolyte solution can be suppressed as much as possible due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The inner sub-space containing the hydraulic electrolyte solution is suitable for a large current discharge from the capacitance. By contrast, the outer sub-space containing the hydraulic electrolyte solution is suitable for a small current discharge from the capacitance.

It is also preferable that the separation wall comprises at least a cylindrically-shaped wall to form at least two co-axially aligned cylindrically-shaped sub-spaces. For example, an organic electrolyte solution exhibiting a small amount of evaporation may be contained in the outer sub-space whilst a hydraulic electrolyte solution possessing a high ion conductivity may be contained in the inner sub-space whereby the good property such as the high ion conductivity can be obtained whilst the evaporation of the electrolyte solution can be suppressed as much as possible due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The inner sub-space containing the hydraulic electrolyte solution is suitable for a large current discharge from the capacitance. By contrast, the outer sub-space containing the hydraulic electrolyte solution is suitable for a small current discharge from the capacitance.

It is also preferable that different kinds of the electrolyte solution are contained in the sub-spaces. In this case, it is further preferable that the different kinds of the electrolyte solution comprise different hydraulic electrolyte solutions such as a sulfuric acid solution, a potassium hydroxide solution and a sodium chloride solution. Alternatively, it is also preferable that the different kinds of the electrolyte solution comprise an organic electrolyte solution such as dimethyl formamide solution into which an ammonium salt is dissolved, and a hydraulic electrolyte solution such as a sulfuric acid solution, a potassium hydroxide solution and a sodium chloride solution. For example, the organic electrolyte solution exhibiting a small amount of evaporation may be contained in the left sub-space whilst the hydraulic electrolyte solution possessing a high ion conductivity may be contained in the right sub-space whereby the good property such as the high ion conductivity can be obtained whilst the evaporation of the electrolyte solution can be suppressed due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The right sub-space containing the hydraulic electrolyte solution is suitable for a large current discharge from the capacitance. By contrast, the left sub-space containing the hydraulic electrolyte solution is suitable for a small current discharge from the capacitance.

It is also preferable that at least an inner wall portion of the gasket and at least surface regions of the separation wall are made of an insulating material.

It is also preferable that the polarizable electrodes in the form of each pair are separated by a separator from each other.

It is also preferable that the polarizable electrodes in the form of each pair are distanced from each other so that the polarizable electrodes are electrically insulated from each other.

It is also preferable that the polarizable electrodes are spaced apart from an inner wall of the gasket.

It is also preferable that the polarizable electrodes are in contact with an inner wall of the gasket.

The above electric double layer capacitor in accordance with the first present invention provides the following effects. It is possible to form the electric double layer capacitor responsible for the multi-purposes by containing different electrolyte solutions in the sub-spaces separated by the separation wall without, however, increase in the number of parts of the capacitor and also without scaling up. This means it possible to improve the productivity and the scaling down of the electric double layer capacitor.

Further, it is possible to keep the high reliability of the electric double layer capacitor by suppressing an amount of the gas generated in an oxidation-reduction reaction upon application of a driving voltage to the capacitor and also suppressing an evaporation of the electrolyte solution with keeping a good characteristic provided by the high ion conductivity.

The third present invention also provides an electric double layer capacitor comprising: a frame-shaped gasket having opposite opening sides distanced in a first direction; a pair of flat plate collectors extending in parallel to a plane vertical to the first direction and the flat plate collectors being tightly fitted with the gasket to form a tightly sealed internal space; and porous polarizable electrodes with an electrolyte solution being accommodated in the tightly sealed internal space, wherein the gasket has at least a separation wall extending in parallel to the first direction and the separation wall separates the internal space into at least two sub-spaces, so that each of the sub-spaces accommodates a pair of the polarizable electrodes and the electrolyte solution. This allows the electrolyte solution to be separated by the separation wall. This also allows a high productivity of the electric double layer capacitor.

It is preferable that the separation wall comprises a single flat wall to form two generally rectangular-parallelepiped sub-spaces.

It is also preferable that the separation wall comprises a plurality of flat walls to form at least three generally rectangular-parallelepiped sub-spaces.

It is also preferable that the separation wall comprises at least a prism-shaped wall to form at least two co-axially aligned prism-shaped sub-spaces. For example, an organic electrolyte solution exhibiting a small amount of evaporation may be contained in the outer sub-space whilst a hydraulic electrolyte solution possessing a high ion conductivity may be contained in the inner sub-space whereby the good property such as the high ion conductivity can be obtained whilst the evaporation of the electrolyte solution can be suppressed as much as possible due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The inner sub-space containing the hydraulic electrolyte solution is suitable for a large current discharge from the capacitance. By contrast, the outer sub-space containing the hydraulic electrolyte solution is suitable for a small current discharge from the capacitance.

It is also preferable that the separation wall comprises at least a cylindrically-shaped wall to form at least two co-axially aligned cylindrically-shaped sub-spaces. For example, an organic electrolyte solution exhibiting a small amount of evaporation may be contained in the outer sub-space whilst a hydraulic electrolyte solution possessing a high ion conductivity may be contained in the inner sub-space whereby the good property such as the high ion conductivity can be obtained whilst the evaporation of the electrolyte solution can be suppressed as much as possible due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The inner sub-space containing the hydraulic electrolyte solution is suitable for a large current discharge from the capacitance. By contrast, the outer sub-space containing the hydraulic electrolyte solution is suitable for a small current discharge from the capacitance.

It is also preferable that different kinds of the electrolyte solution are contained in the sub-spaces. In this case, it is further preferable that the different kinds of the electrolyte solution comprise different hydraulic electrolyte solutions such as a sulfuric acid solution, a potassium hydroxide solution and a sodium chloride solution. Alternatively, it is also preferable that the different kinds of the electrolyte solution comprise an organic electrolyte solution such as dimethyl formamide solution into which an ammonium salt is dissolved, and a hydraulic electrolyte solution such as a sulfuric acid solution, a potassium hydroxide solution and a sodium chloride solution. For example, the organic electrolyte solution exhibiting a small amount of evaporation may be contained in the left sub-space whilst the hydraulic electrolyte solution possessing a high ion conductivity may be contained in the right sub-space whereby the good property such as the high ion conductivity can be obtained whilst the evaporation of the electrolyte solution can be suppressed due to a reduced area of the hydraulic electrolyte solution. This results in an increase in a reliability of the electric double layer capacitor. The hydraulic electrolyte solution providing a high ion conductivity increases a capacitance and may compensate a reduced capacitance due to the organic electrolyte solution. The right sub-space containing the hydraulic electrolyte solution is suitable for a large current discharge from the capacitance. By contrast, the left sub-space containing the hydraulic electrolyte solution is suitable for a small current discharge from the capacitance.

It is also preferable that at least an inner wall portion of the gasket and at least surface regions of the separation wall are made of an insulating material.

It is also preferable that the polarizable electrodes in the form of each pair are separated by a separator from each other.

It is also preferable that the polarizable electrodes in the form of each pair are distanced from each other so that the polarizable electrodes are electrically insulated from each other.

It is also preferable that the polarizable electrodes are spaced apart from an inner wall of the gasket.

It is also preferable that the polarizable electrodes are in contact with an inner wall of the gasket.

The above electric double layer capacitor in accordance with the first present invention provides the following effects. It is possible to form the electric double layer capacitor responsible for the multi-purposes by containing different electrolyte solutions in the sub-spaces separated by the separation wall without, however, increase in the number of parts of the capacitor and also without scaling up. This means it possible to improve the productivity and the scaling down of the electric double layer capacitor.

Further, it is possible to keep the high reliability of the electric double layer capacitor by suppressing an amount of the gas generated in an oxidation-reduction reaction upon application of a driving voltage to the capacitor and also suppressing an evaporation of the electrolyte solution with keeping a good characteristic provided by the high ion conductivity.

PREFERRED EMBODIMENTS

First Embodiment

Figure 4:
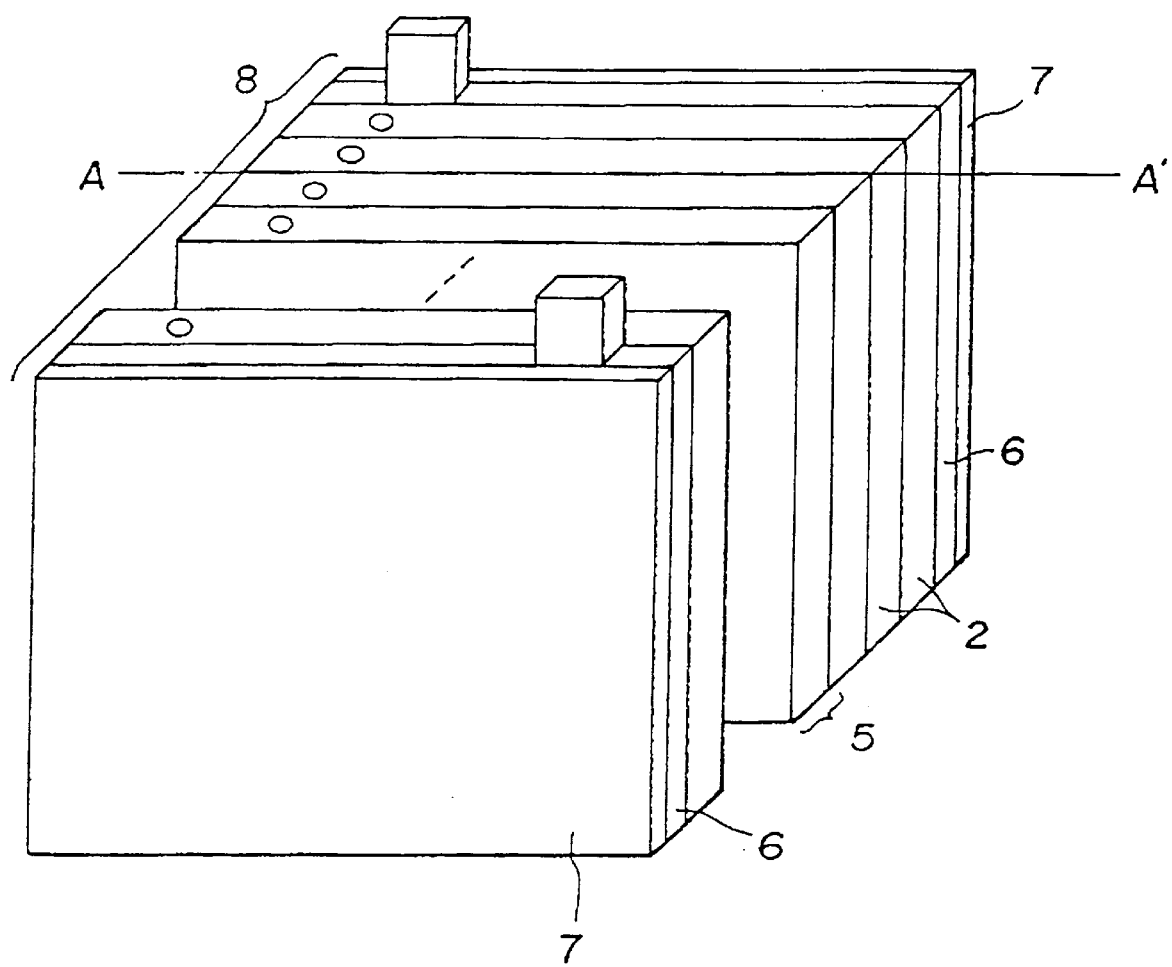
FIG. 4 is a schematic perspective view illustrative of a cell lamination structure of a novel electric double layer capacitor in a first embodiment in accordance with the present invention.
Figure 5:
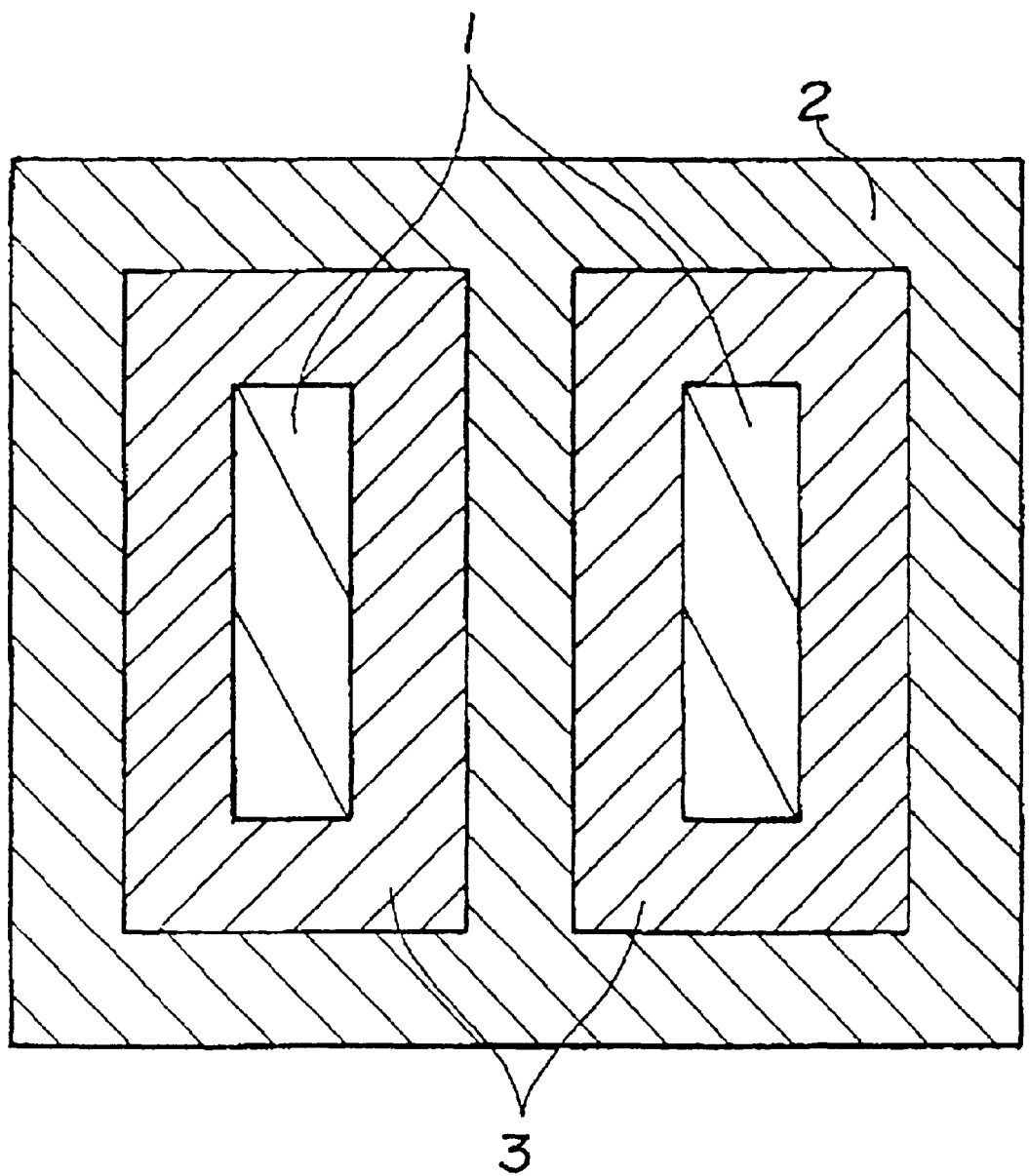
FIG. 5 is a cross sectional view illustrative of a novel electric double layer capacitor taken along an A–A' line of FIG. 4 in a first embodiment in accordance with the present invention.
Figure 6:
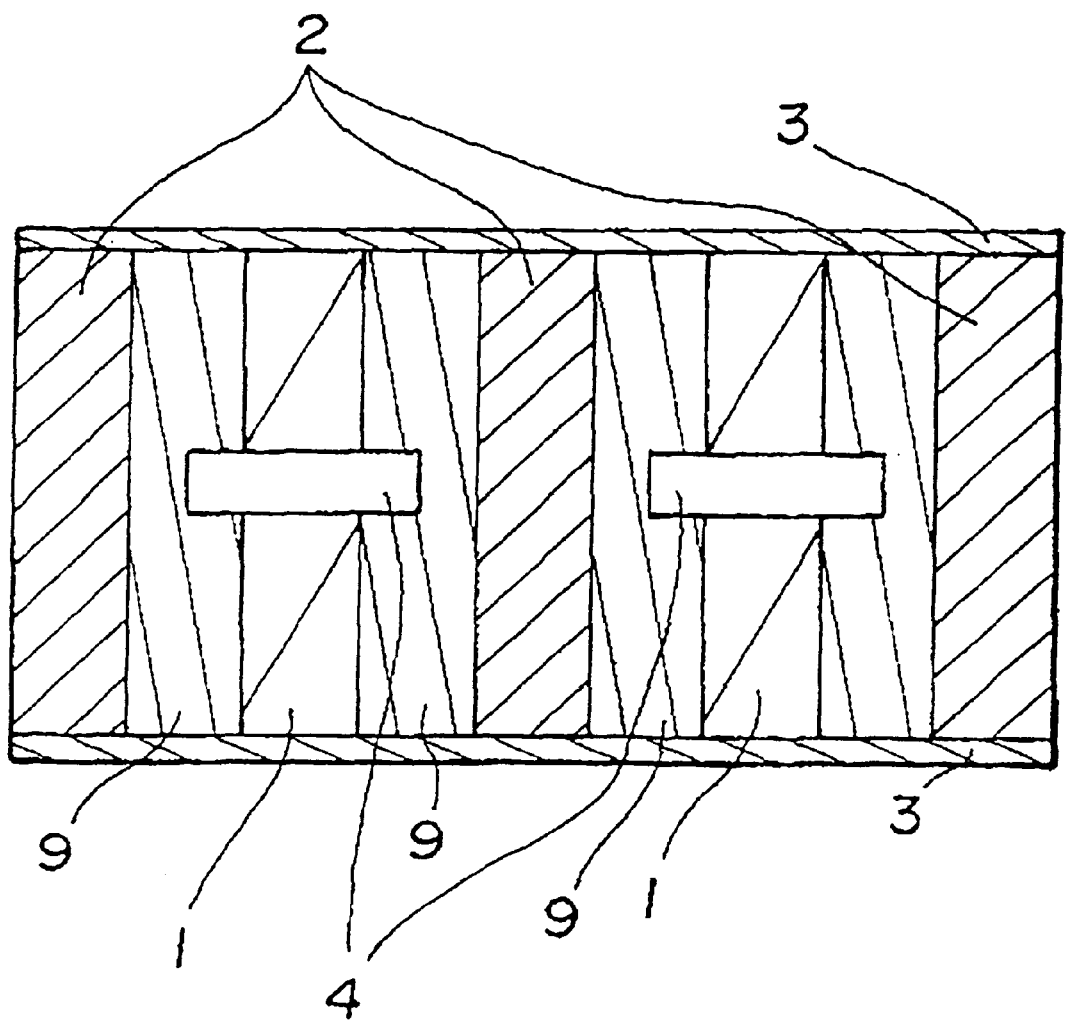
FIG. 6 is a cross sectional view illustrative of a cell structure of a novel electric double layer capacitor of FIG. 4 in a first embodiment in accordance with the present invention.

A first embodiment according to the present invention will be described in detail with reference to FIGS. 4 through 6. FIG. 4 is a schematic perspective view illustrative of a cell lamination structure of a novel electric double layer capacitor. FIG. 5 is a cross sectional view illustrative of a novel electric double layer capacitor taken along an A–A' line of FIG. 4. FIG. 6 is a cross sectional view illustrative of a cell structure of a novel electric double layer capacitor of FIG. 4.

With reference to FIG. 4, a cell lamination structure 8 of the novel electric double layer capacitor comprises gaskets 2, basic cells 5 adjacent to the gaskets 2, terminal electrodes 6 sandwiching the gaskets 2 and the basic cells 5, pressure plates 7 sandwiching the terminal electrodes 6.

With reference to FIGS. 5 and 6, the gasket 2 has a separation wall which separates an inner space of the gasket 2 into two cells or right and left cells. The separation wall extends in a direction toward which the cells are laminated. The gasket 2 with the separation wall surrounds a pair of right and left collectors 3, each of which further surrounds a pair of polarizable electrodes 1. Namely, the right and left pairs of the polarizable electrodes 1 are accommodated in the right and left cells defined by the gasket 2 with the separation wall. The polarizable electrode 1 may comprise an activated carbon in solid state. The activated carbon may be formed by blending powdered activated carbons with binder such as phenol resin for subsequent burning the mixture. The activated carbon has many pores for containing an electrolyte solution so that charges are accumulated on interfaces between the electrolyte solution and inner walls of the pores of the activated carbon of the polarizable electrode 1. The collector 3 may comprise a butyl rubber sheet blended with powdered carbon, even the collector 3 may be made of a metal foil. Individually paired polarized electrodes contained in each of the right and left cells are separated by a porous separator 4. The porous separator 4 comprises a non-conductive and ion-permeable film, for example, a glass fiber film which is often used for a lead battery. The gasket 2 with the separation wall may be made of an electrically insulative material such as a plastic, for example, heat resistive plastic such as ABS resin. In the right and left cells defined by the gasket 2 with the separation wall, different kinds of the electrolyte solution 9 are contained. The collectors 3 are tightly fitted with the gasket 2 and the separation wall to form the basic cell 5. A plurality of the basic cells 5 are laminated in series to each other as illustrated in FIG. 4. The polarizable electrode 1 has a size of 30 millimeters in length, 50 millimeters in width and 1 millimeter in height. The right and left cells of the gasket 2 have the same size of 35 millimeters in length, 54 millimeters in width and 2.2 millimeters in height. The porous separator 4 has a size of 32 millimeters in length, 52 millimeters in width and 0.2 millimeters in height. The collector 3 has a size of 78 millimeters in length, 58 millimeters in width and 0.2 millimeters in height.

Twenty of the above basic cells 5 are laminated in series to each other to form a cell lamination 8 which has a withstand voltage of 18 V. A first kind of the electrolyte solution 9 is contained in the right cell of the gasket 2, wherein the first kind of the electrolyte solution 9 comprises a 30 wt %-diluted sulfuric acid solution. A second kind of the electrolyte solution 9 is contained in the left cell of the gasket 2, wherein the second kind of the electrolyte solution 9 comprises a 20 wt %-diluted sodium chloride solution. For making the polarized electrode 1, a phenol-based powdered activated carbon and a powdered phenol-based resin are blended at a weight ratio of 70:30.

As a first modification to the above first embodiment, it is possible to use a dimethyl formamide solution dissolved with an ammonium salt in the left cell of the gasket 2.

As a second modification of the above first embodiment, the polarizable electrode 1 is made of a coconut meal-based powdered activated carbon.

As a third modification to the above first embodiment, the felt-paired polarizable electrodes 1 accommodated in the left cell of the gasket 2 are made of a phenol-based powdered activated carbon, whilst the right-paired polarizable electrodes 1 accommodated in the right cell of the gasket 2 are made of a coconut meal based powdered activated carbon.

Second Embodiment

Figure 7:
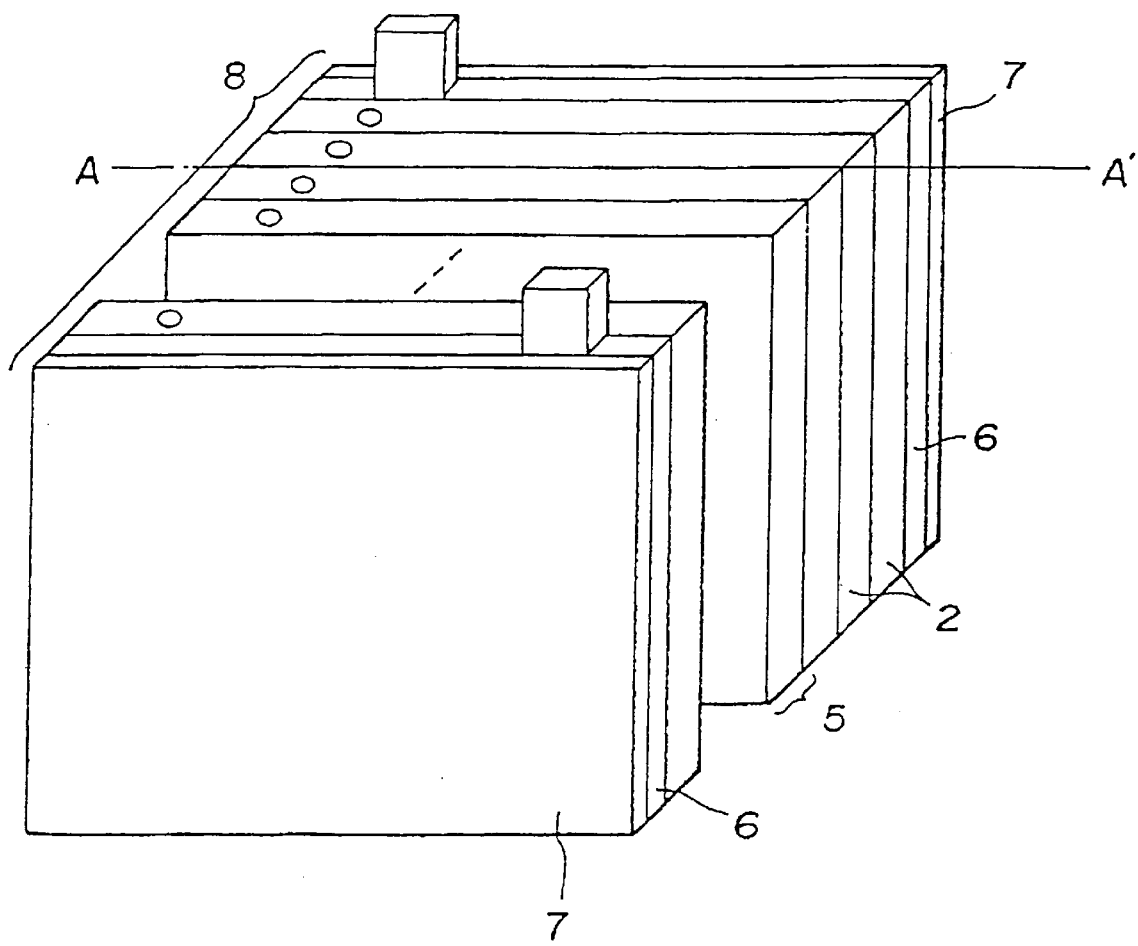
FIG. 7 is a schematic perspective view illustrative of a cell lamination structure of a novel electric double layer capacitor in a second embodiment in accordance with the present invention.
Figure 8:
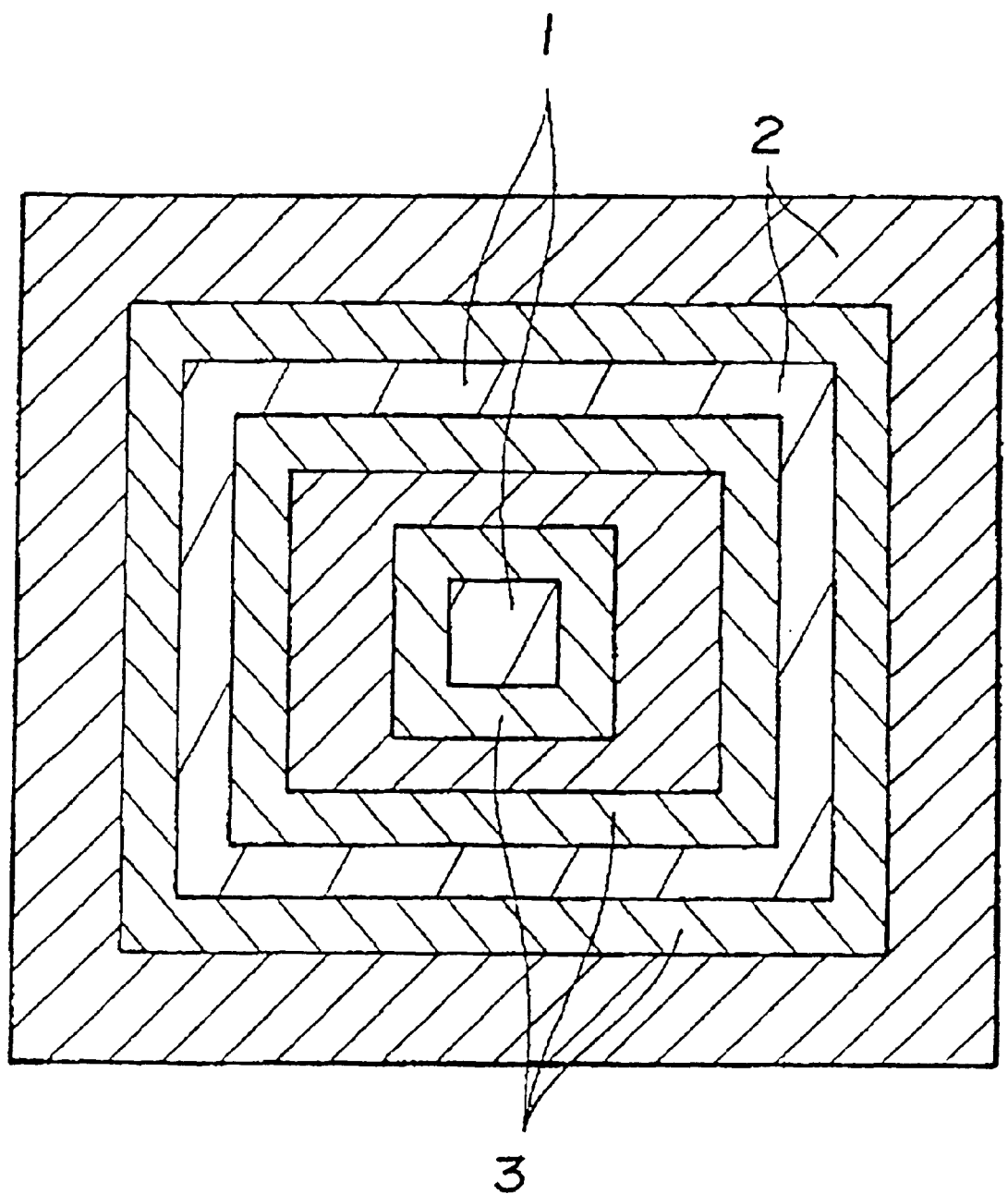
FIG. 8 is a cross sectional view illustrative of a novel electric double layer capacitor taken along an A–A' line of FIG. 7 in a second embodiment in accordance with the present invention.
Figure 9:
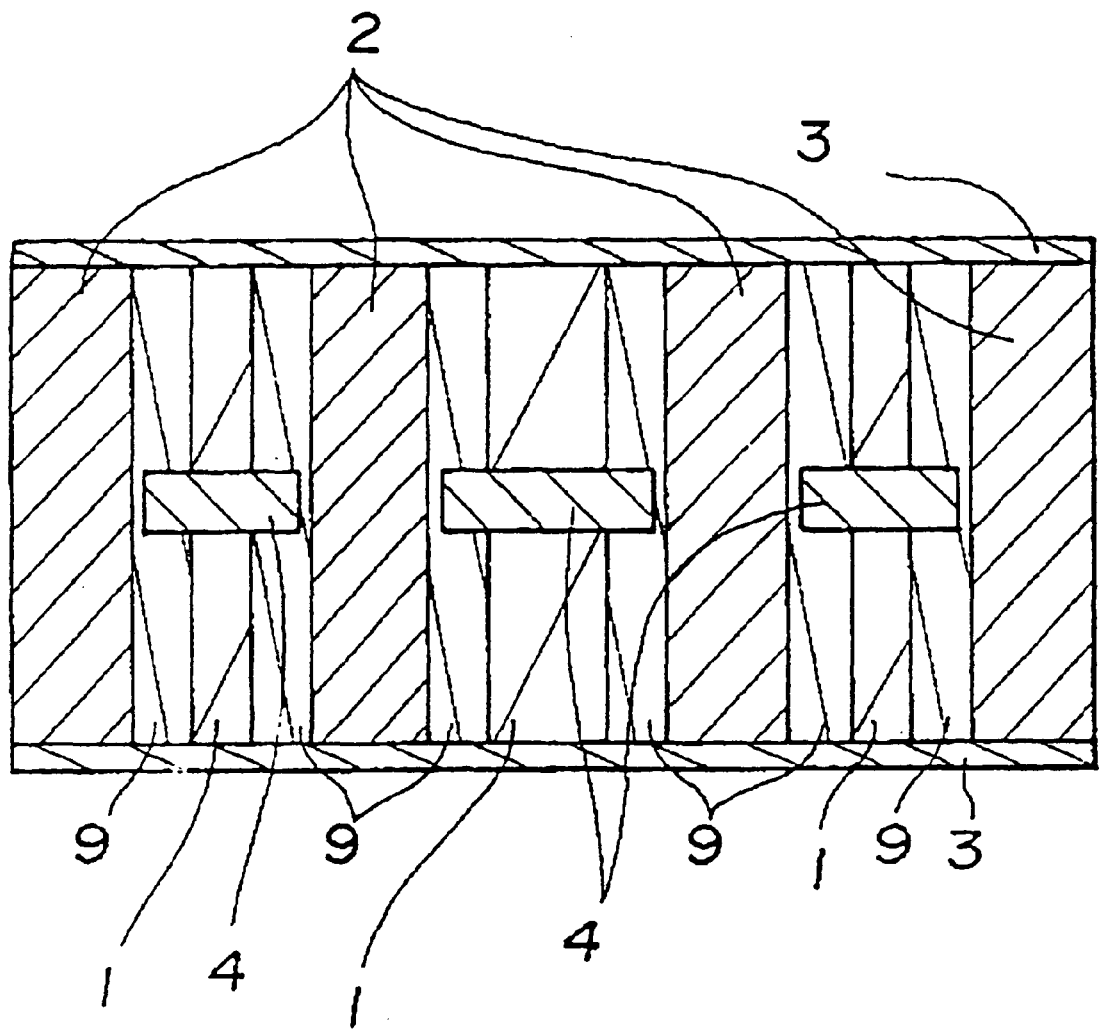
FIG. 9 is a cross sectional view illustrative of a cell structure of a novel electric double layer capacitor of FIG. 7 in a second embodiment in accordance with the present invention.

A second embodiment according to the present invention will be described in detail with reference to FIGS. 7 through 9. FIG. 7 is a schematic perspective view illustrative of a cell lamination structure of a novel electric double layer capacitor. FIG. 8 is a cross sectional view illustrative of a novel electric double layer capacitor taken along an A–A' line of FIG. 7. FIG. 9 is a cross sectional view illustrative of a cell structure of a novel electric double layer capacitor of FIG. 7.

With reference to FIG. 7, a cell lamination structure 8 of the novel electric double layer capacitor comprises gaskets 2, basic cells 5 adjacent to the gaskets 2, terminal electrodes 6 sandwiching the gaskets 2 and the basic cells 5, pressure plates 7 sandwiching the terminal electrodes 6.

With reference to FIGS. 8 and 9, the gasket 2 has a separation wall which separates an inner space of the gasket 2 into two cells or inner and outer cells. The separation wall extends in a direction toward which the cells are laminated. The separation wall is in the form of a square-pole shape. The square-pole shaped separation wall is aligned to have a co-axis with the square-pole shaped gasket 2. The gasket 2 and the square-pole shaped separation wall surround the outer collection 3 and the outer pair of the polarizable electrodes 1. The square-pole shaped separation wall surround the inner collection 3 and the inner pair of the polarizable electrodes 1. Namely, the outer collector 3 and the outer pair of the polarizable electrodes 1are accommodated in the outer cell defined between the square-pole shaped separation wall and the gasket 2. The inner collector 3 and the inner pair of the polarizable electrodes 1 are accommodated in the inner cell defined by the square-pole shaped separation wall. The polarizable electrode 1 may comprise an activated carbon in solid state. The activated carbon may be formed by blending powdered activated carbons with binder such as phenol resin for subsequent burning the mixture. The activated carbon has many pores for containing an electrolyte solution so that charges are accumulated on interfaces between the electrolyte solution and inner walls of the pores of the activated carbon of the polarizable electrode 1. The collector 3 may comprise a butyl rubber sheet blended with powdered carbon, even the collector 3 may be made of a metal foil. Individually paired polarized electrodes contained in each of the right and left cells are separated by a porous separator 4. The porous separator 4 comprises a non-conductive and ion-permeable film, for example, a glass fiber film which is often used for a lead battery. The gasket 2 with the separation wall made by made of an electrically insulative material such as a plastic, for example, heat resistive plastic such as ABS resin. In the right and left cells defined by the gasket 2 with the separation wall, different kinds of the electrolyte solution 9 are contained. The collectors 3 are tightly fitted with the gasket 2 and the separation wall to form the basic cell 5. A plurality of the basic cells 5 are laminated in series to each other as illustrated in FIG. 7. The outer polarizable electrode 1 has a peripheral size of 70 millimeters in length, 50 millimeters in width and 1 millimeter in height and an inner size of 60 millimeters in length, 30 millimeters in width and 1 millimeter in height. The inner polarizable electrode 1 has a size of 35 millimeters in length, 15 millimeters in width and 1 millimeter in height. The gasket 2 has an inner size of 40 millimeters in length, 20 millimeters in width and 2.2 millimeters in height. The square-pole shaped separation wall has a width of 5 millimeters and an inner size of 40 millimeters in length, 20 millimeters in width and 2.2 millimeters in height. The outer porous separator 4 has a width of 12 millimeters and a size of 72 millimeters in length, 52 millimeters in width and 0.2 millimeters in height. The inner porous separator 4 has a size of 37 millimeters in length, 17 millimeters in width and 1 millimeters in height.

Twenty of the above basic cells 5 are laminated in series to each other to form a cell lamination 8 which has a withstand voltage of 18 V. A first kind of the electrolyte solution 9 is contained in the inner cell of the gasket 2, wherein the first kind of the electrolyte solution 9 comprises a 30 wt %-diluted sulfuric acid solution. A second kind of the electrolyte solution 9 is contained in the outer cell of the gasket 2, wherein the second kind of the electrolyte solution 9 comprises a 20 w %-diluted sodium chloride solution. For making the polarized electrode 1, a phenol-based powdered activated carbon and a powdered phenol-based resin are blended at a weight ratio of 70:30.

As a first modification to the above second embodiment, it is possible to use a dimethyl formamide solution dissolved with an ammonium salt in the outer cell of the gasket 2.

As a second modification of the above second embodiment, the polarizable electrode 1 is made of a coconut meal-based powdered activated carbon.

COMPARATIVE EXAMPLE 1

Figure 2:
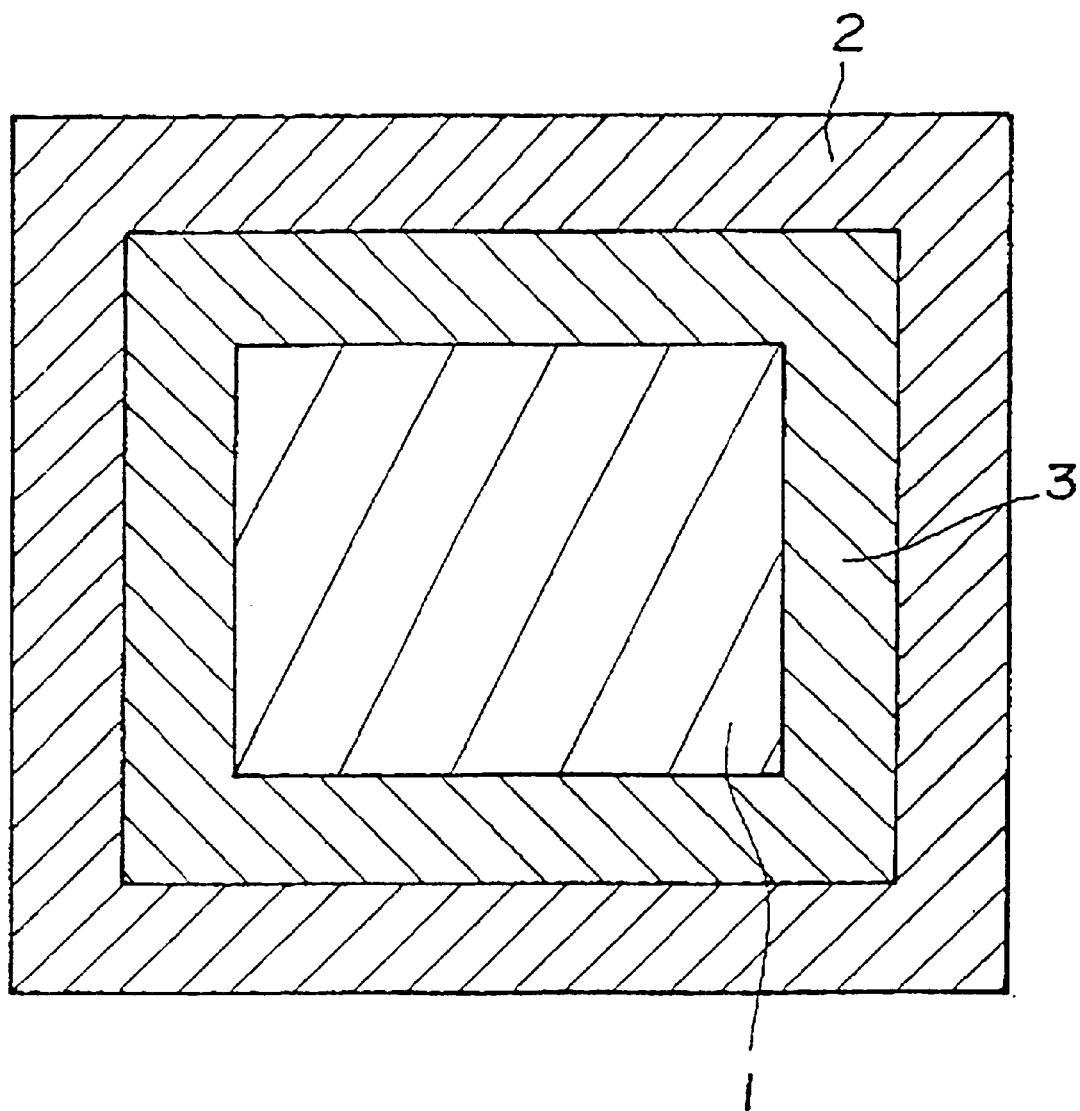
FIG. 2 is a cross sectional view illustrative of a conventional electric double layer capacitor taken along an A–A' line of FIG. 1.
Figure 3:
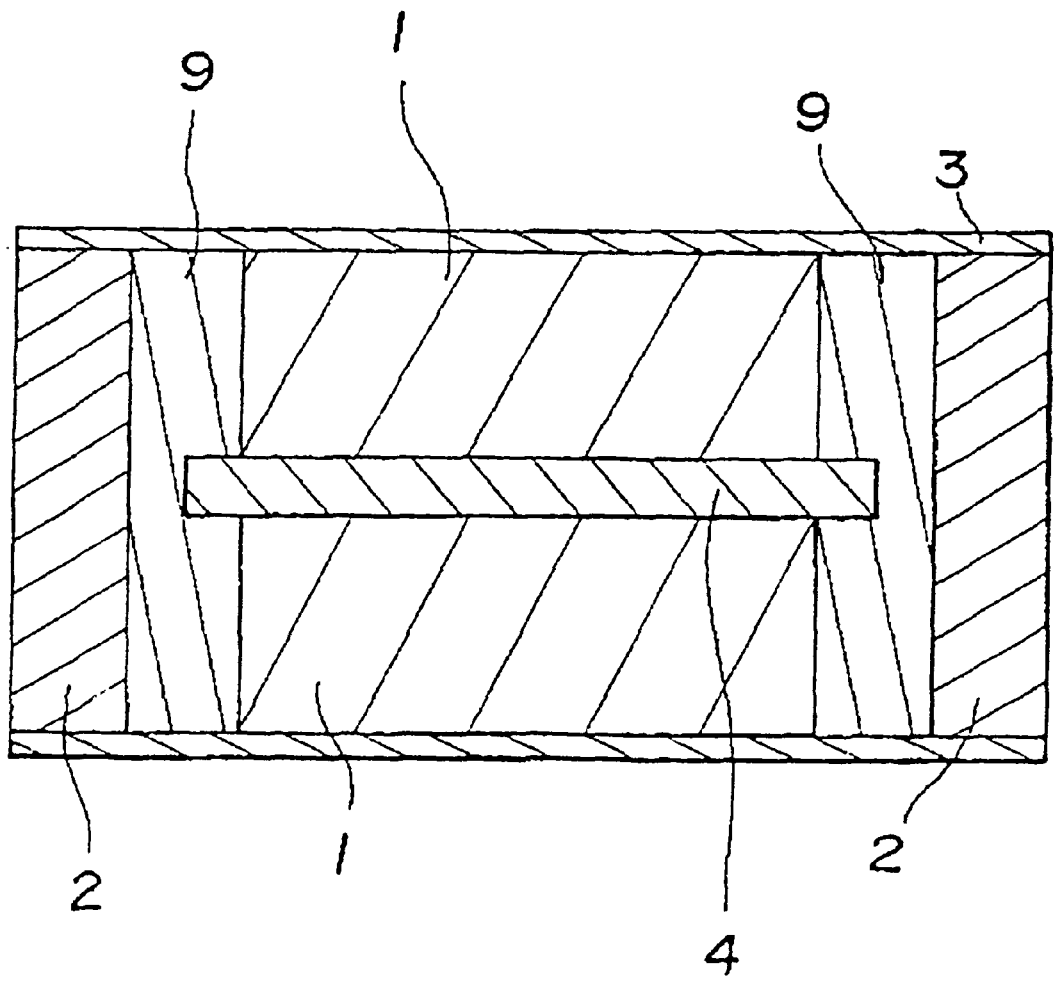
FIG. 3 is a cross sectional view illustrative of a cell structure of a conventional electric double layer capacitor of FIG. 1.

A comparative example 1 to the present invention will subsequently be described. The structure of the basic cell 5 is as illustrated in FIG. 2. The gasket 2 is free of separation wall and has a single cell for accommodating a single pair of the polarizable electrodes 1 separated by a single porous separator 4. The other conditions for making the capacitor and the materials of the individual parts of the capacitor are the same as in the above first and second embodiments. The polarizable electrode 1 has a size of 70 millimeters in length, 50 millimeters in width and 1 millimeter in height. The gasket 2 has an inner size of 74 millimeters in length, 54 millimeters in width and 2.2 millimeters in height. The porous separator 4 has a size of 72 millimeters in length, 50 millimeters in width and 0.2 millimeters in height. The electrolyte solution 9 is prepared which comprises a 30 wt %-diluted sulfuric acid solution.

COMPARATIVE EXAMPLE 2

A comparative example 2 to the present invention will subsequently be described. The structure of the basic cell 5 is as illustrated in FIG. 2. The gasket 2 is free of separation wall and has a single cell for accommodating a single pair of the polarizable electrodes 1 separated by a single porous separator 4. The other conditions for making the capacitor and the materials of the individual parts of the capacitor are the same as in the above first and second embodiments. The polarizable electrode 1 has a size of 70 millimeters in length, 50 millimeters in width and 1 millimeter in height. The gasket 2 has an inner size of 74 millimeters in length, 54 millimeters in width and 2.2 millimeters in height. The porous separator 4 has a size of 72 millimeters in length, 50 millimeters in width and 0.2 millimeters in height. The electrolyte solution 9 is prepared which comprises a 20 wt %-diluted sodium chloride solution.

The electric double layer capacitors in the first and second embodiments and in the first and second comparative examples are subjected to the reliability test and evaluation of the large current discharge characteristic and an initial characteristics.

The reliability test was conducted by leaving the capacitors at a high temperature of 70° C. under an application of a 18 V for 1000 hours before a discharge is made prior to measurement of electrostatic capacitance of the electric double layer capacitors. Individual initial values of the capacitance of the electric double layer capacitors and subsequent variations ΔC of the capacitance values are measured to find a ratio of the variation ΔC to the initial value C of the capacitance of the each electric double layer capacitor. Further, an initial value of ESR and subsequent variation of ESR values are found to find a ratio of the variation ΔE to the initial value E. The measurement of the static capacitance is conducted by charging the capacitors with 18 V for one hour for subsequent constant current discharge in order to measure a time duration for drop in voltage from 9.6 V to 8.0 V.

The measurement of ESR is made by measuring an impedance at a test signal frequency of 1 kHz in an alternating current four probe method so as to calculate the real number part of the impedance. Concurrently, a ratio of an initial weight W of the electrolyte solution to variations ΔW of the electrolyte solution weight is also calculated. The comparisons in the static capacitance and the ESR value between the capacitors are made with reference to the first comparative example as 1. The large current discharge characteristic is found by setting the static capacitance at 10 when a discharge is made at the standard current value so that variations of the static capacitance are found upon a large current discharge of 10 times higher than the standard current value.

30 samples of each of the capacitors in the first and second embodiments and the first and second comparative examples were tested as described above to obtain average values thereof. The results of the tests are shown on the following tables 1 and 2.

TABLE 1

(reliability test)

| level (18V) | ΔC/C (%) | ΔE/E (%) | ΔW/W (%) |
|---|---|---|---|
| 1st Embodiment | −19.2 | +10.6 | −4 |
| 1st Mod. to 1st Em. | −10.2 | +10.7 | −2 |
| 2nd Mod. to 1st Em. | −9.8 | +6.4 | −5 |
| 3rd Mod. to 1st Em. | −13.9 | +10.2 | −5 |
| 2nd Embodiment | −18.0 | +10.9 | −7 |
| 1st Mod. to 2nd Em. | −9.6 | +6.7 | 0 |
| 2nd Mod. to 2nd Em. | −13.4 | +10.9 | −5 |
| Com. Ex. 1 | −55.3 | +320.4 | −8 |
| Com. Ex. 2 | −40.0 | +9.9 | −3 |

The above table 1 shows the followings. The novel electric double layer capacitors in the first and second embodiments in accordance with the present invention show the ratios of variations of the static capacitances in the range of −9.6% to −19.2%. By contrast, the conventional electric double layer capacitors in the first and second comparative examples show the ratios of variations of the static capacitances in the range of −40.0% to −55.3%. The novel electric double layer capacitors possess much lower static capacitance variation ratios than the conventional electric double layer capacitors.

Further, the novel electric double layer capacitors in the first and second embodiments in accordance with the present invention show the ratios of variations of ESR in the range of +10.9% to +6.4%. By contrast, the conventional electric double layer capacitor in the first comparative example shows the ratio of variations of ESR at +320.4%. The conventional electric double layer capacitor in the first comparative example shows the ratio of variations of ESR at +9.9%. In the second comparative example, the sodium chloride solution is used which generates a much smaller amount of a gas generated by the oxidation-reduction reaction. This results in a small expansion of the capacitor due to the gas generation, resulting in a small increase in contact resistance of the capacitor.

As compared to the conventional electric double layer capacitors, the novel electric double layer capacitors in the first and second embodiments in accordance with the present invention show small variations in the static capacitance and in the ESR value. This is resulted from the fact that the gasket 2 has the separation wall to separate the inner space into the two cells so as to reduce the area of the hydraulic electrolyte solution which is likely to be evaporated thereby suppressing the amount of evaporation of the solution.

The novel electric double layer capacitor in the first modification to the second embodiment in accordance with the present invention shows a low variation ratio of the ESR value. In the first modification to the second embodiment in accordance with the present invention, the hydraulic electrolyte solution dissolved with sulfuric acid, which is likely to be evaporated, is contained in the inner cell of the gasket whilst the organic electrolyte solution dissolved, which is unlikely to be evaporated, is contained in the outer cell of the gasket, thereby to reduce the area of the hydraulic electrolyte solution for suppressing the amount of evaporation of the solution.

TABLE 2

(characteristic test)

| level | Int. ESR | Int. C | large current discharge C |
|---|---|---|---|
| 1st Embodiment | 1.3 | 0.8 | 70 |
| 1st Mod. to 1st Em. | 1.8 | 0.9 | 60 |
| 2nd Mod. to 1st Em. | 1.3 | 0.5 | 70 |
| 3rd Mod. to 1st Em. | 1.3 | 0.7 | 70 |
| 2nd Embodiment | 1.3 | 0.8 | 70 |
| 1st Mod. to 2nd Em. | 1.8 | 0.9 | 60 |
| 2nd Mod. to 2nd Em. | 1.3 | 0.7 | 70 |
| Com. Ex. 1 | 1.0 | 1.0 | 80 |
| Com. Ex. 2 | 1.6 | 0.5 | 60 |

The above table 2 shows the followings. The electric double layer capacitors in the first and second embodiments in accordance with the present invention and in the first and second comparative examples have differences of the initial static capacitances among them. Those differences may be considered to be caused by differences in ratios of ions which enter into micro-pores having the electric double layers due to differences in ion conductivity and ion diameter. The differences of the capacitors may be considered to be caused by differences in ion conductivity of the electrolyte solutions. Further, the differences in drop of the capacitance upon the large current discharge may be considered to be caused by the differences in drop of the product of the current and resistance and also in the ion mobility due to differences in the initial values of ESR.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An internal structure of a gasket for an electric double layer capacitor, wherein said internal structure of said gasket has at least a separation wall which separates an internal space of said gasket into at least two sub-spaces, wherein each of said sub-spaces accommodates a pair of polarizable electrodes and an electrolyte solution.

2. The internal structure of said gasket as claimed in claim 1, wherein said separation wall extends along a direction vertical to a plane parallel to which collector plates are provided to define a sealed inner space in combination with said gasket.

3. The internal structure of said gasket as claimed in claim 2, wherein said separation wall comprises a single flat wall to form two generally rectangular-parallelepiped sub-spaces.

4. The internal structure of said gasket as claimed in claim 2, wherein said separation wall comprises a plurality of flat walls to form at least three generally rectangular-parallelepiped sub-spaces.

5. The internal structure of said gasket as claimed in claim 2, wherein said separation wall comprises at least a prism-shaped wall to form at least two co-axially aligned prism-shaped sub-spaces.

6. The internal structure of said gasket as claimed in claim 2, wherein said separation wall comprises at least a cylindrically-shaped wall to form at least two co-axially aligned cylindrically-shaped sub-spaces.

7. The internal structure of said gasket as claimed in claim 1, wherein different kinds of said electrolyte solution are contained in said sub-spaces.

8. The internal structure of said gasket as claimed in claim 7, wherein said different kinds of said electrolyte solution comprise different hydraulic electrolyte solutions.

9. The internal structure of said gasket as claimed in claim 7, wherein said different kinds of said electrolyte solution comprise an organic electrolyte solution and a hydraulic electrolyte solution.

10. The internal structure of said gasket as claimed in claim 1, wherein at least an inner wall portion of said gasket and at least surface regions of said separation wall are made of an insulating material.

11. An electric double layer capacitor comprising:

a gasket;

a pair of collectors tightly fitted with said gasket to form a tightly sealed internal space; and polarizable electrodes with an electrolyte solution being accommodated in said tightly sealed inner space, wherein said gasket has at least a separation wall which separates said internal space into at least two sub-spaces, wherein each of said sub-spaces accommodates a pair of said polarizable electrodes and said electrolyte solution.

12. The electric double layer capacitor as claimed in claim 11, wherein said separation wall extends along a direction vertical to a plane parallel to which collector plates are provided to define said tightly sealed inner space in combination with said gasket.

13. The electric double layer capacitor as claimed in claim 12, wherein said separation wall comprises a single flat wall to form two generally rectangular-parallelepiped sub-spaces.

14. The electric double layer capacitor as claimed in claim 12, wherein said separation wall comprises a plurality of flat walls to form at least three generally rectangular-parallelepiped sub-spaces.

15. The electric double layer capacitor as claimed in claim 12, wherein said separation wall comprises at least a prism-shaped wall to form at least two co-axially aligned prism-shaped sub-spaces.

16. The electric double layer capacitor as claimed in claim 12, wherein said separation wall comprises at least a cylindrically-shaped wall to form at least two co-axially aligned cylindrically-shaped sub-spaces.

17. The electric double layer capacitor as claimed in claim 11, wherein different kinds of said electrolyte solution are contained in said sub-spaces.

18. The electric double layer capacitor as claimed in claim 17, wherein said different kinds of said electrolyte solution comprise different hydraulic electrolyte solutions.

19. The electric double layer capacitor as claimed in claim 17, wherein said different kinds of said electrolyte solution comprise an organic electrolyte solution and a hydraulic electrolyte solution.

20. The electric double layer capacitor as claimed in claim 11, wherein at least an inner wall portion of said gasket and at least surface regions of said separation wall are made of an insulating material.

21. The electric double layer capacitor as claimed in claim 11, wherein said polarizable electrodes in the form of each pair are separated by a separator from each other.

22. The electric double layer capacitor as claimed in claim 11, wherein said polarizable electrodes in the form of each pair are distanced from each other so that said polarizable electrodes are electrically insulated from each other.

23. The electric double layer capacitor as claimed in claim 11, wherein said polarizable electrodes are spaced apart from an inner wall of said gasket.

24. The electric double layer capacitor as claimed in claim 11, wherein said polarizable electrodes are in contact with an inner wall of said gasket.

25. An electric double layer capacitor comprising:

a frame-shaped gasket having opposite opening sides distanced in a first direction;

a pair of flat plate collectors extending in parallel to a plane vertical to said first direction and said flat plate collectors being tightly fitted with said gasket to form a tightly sealed internal space; and porous polarizable electrodes with an electrolyte solution being accommodated in said tightly sealed internal space, wherein said gasket has at least a separation wall extending in parallel to said first direction and said separation wall separates said internal space into at least two sub-spaces, wherein each of said sub-spaces accommodates a pair of said polarizable electrodes and said electrolyte solution.

26. The electric double layer capacitor as claimed in claim 24, wherein said separation wall comprises a single flat wall to form two generally rectangular-parallelepiped sub-spaces.

27. The electric double layer capacitor as claimed in claim 24, wherein said separation wall comprises a plurality of flat walls to form at least three generally rectangular-parallelepiped sub-spaces.

28. The electric double layer capacitor as claimed in claim 24, wherein said separation wall comprises at least a prism-shaped wall to form at least two co-axially aligned prism-shaped sub-spaces.

29. The electric double layer capacitor as claimed in claim 24, wherein said separation wall comprises at least a cylindrically-shaped wall to form at least two co-axially aligned cylindrically-shaped sub-spaces.

30. The electric double layer capacitor as claimed in claim 24, wherein different kinds of said electrolyte solution are contained in said sub-spaces.

31. The electric double layer capacitor as claimed in claim 29, wherein said different kinds of said electrolyte solution comprise different hydraulic electrolyte solutions.

32. The electric double layer capacitor as claimed in claim 29, wherein said different kinds of said electrolyte solution comprise an organic electrolyte solution and a hydraulic electrolyte solution.

33. The electric double layer capacitor as claimed in claim 24, wherein at least an inner wall portion of said gasket and at least surface regions of said separation wall are made of an insulating material.

34. The electric double layer capacitor as claimed in claim 24, wherein said polarizable electrodes in the form of each pair are separated by a separator from each other.

35. The electric double layer capacitor as claimed in claim 24, wherein said polarizable electrodes in the form of each pair are distanced from each other so that said polarizable electrodes are electrically insulated from each other.

36. The electric double layer capacitor as claimed in claim 24, wherein said polarizable electrodes are spaced apart from an inner wall of said gasket.

37. The electric double layer capacitor as claimed in claim 24, wherein said polarizable electrodes are in contact with an inner wall of said gasket.

* * * * *